United States Patent Office 3,471,478
Patented Oct. 7, 1969

3,471,478
16α-AMINOALKYL- AND AMINOALKYNYL STEROIDS
Kurt W. Ledig, Philadelphia, and Gerhard R. Wendt, Havertown, Pa., assignors to American Home Products Corporation, New York, N.Y., a corporation of Delaware
No Drawing. Continuation-in-part of application Ser. No. 625,931, Mar. 27, 1967. This application June 10, 1968, Ser. No. 735,585
Int. Cl. C07c *173/10, 169/08;* A61k *27/00*
U.S. Cl. 260—239.5                       11 Claims

ABSTRACT OF THE DISCLOSURE

16α-aminoalkynyl- and 16α-aminoalkylgona-1,3,5(10)-trienes (I) are useful biocidally as amebacides, fungicides and trichomonacides, and pharmacologically as central nervous system depressants. Compounds (I) wherein the amino groups are fully substituted are prepared by treating the corresponding 16α-alkynylgona-1,3,5-trienes with formaldehyde and a secondary amine then, if required, hydrogenating, and, optionally, alkanoylating the 16β- and 17β-hydroxyl group either before or after hydrogenating. Compounds (I) wherein the amino groups are monosubstituted (bearing one hydrogen) are prepared by treating the corresponding 16-keto steroid with the corresponding propargylamine (generated in situ) then, if required, hydrogenated. Optionally, a mono-substituted amino group either can be alkanoylated before or after hydrogenating.

---

This application is a continuation-in-part of copending application Ser. No. 625,931, filed Mar. 27, 1967 and now abandoned.

This invention is concerned with new 16α-aminoalkyl- and aminoalkyl steroids. The compounds of this invention are biocidally-active, especially against pathogenic amebae, fungi and trichomonads. In addition, they are pharmacologically-active as central nervous system depressant agents and are thus of value of induce calming.

DESCRIPTION OF THE INVENTION

This invention contemplates compounds of Formula I:

$$\text{(I)}$$

wherein:

W is a single or a double bond
R is alkyl of from about 1 to about 5 carbon atoms;
$R^1$ is hydrogen or alkanoyl of from about 2 to about 5 carbon atoms;
$R^2$ is hydrogen, alkyl of from about 1 to about 5 carbon atoms or $$-(R^6)-N\begin{matrix}R^7\\R^8\end{matrix}$$

wherein $R^7$ and $R^8$ are alkyl of from about 1 to about 5 carbon atoms and $R^6$ is a divalent alkylene group containing from about 2 to about 4 carbon atoms; $R^3$ is hydrogen, hydroxy or alkanoyloxy of from about 2 to about 5 carbon atoms; X is hydrogen, hydroxy, alkanoyloxy of from about 2 to about 5 carbon atoms, adamatoyloxy, or, when taken together with $OR^1$, forms a ketal ring of the partial formula wherein $R^4$ and $R^5$ are alkyl of from about 1 to about 5 carbon atoms; and Y is $$-(CH_2)_p-C\equiv C-CH_2N\begin{matrix}A\\B\end{matrix}$$

or $$-CH_2(CH_2)_n-CH_2N\begin{matrix}A\\B\end{matrix}$$

p being 0 or 1, n being 1 or 2, and wherein A and B independently are alkyl of from about 1 to about 5 carbon atoms or $$-(R^6)-N\begin{matrix}R^7\\R^8\end{matrix}$$

wherein $R^6$, $R^7$ and $R^8$ are as defined hereinabove, or when p is 0 and n is 1, B is hydrogen or alkanoyl of from about 2 to about 5 carbon atoms, or when taken together; A and B form a divalent radical selected from $-(CH_2)_m-$, m being a whole number of from about 2 to about 8; $-CH_2CH_2N(R^9)CH_2CH_2-$, $R^9$ being hydrogen or alkyl of from about 1 to about 5 carbon atoms; or $-CH_2CH_2OCH_2CH_2-$; and non-toxic acid-addition salts of the bases thereof.

Special mention is made of a number of particularly valuable embodiments of this invention. These are:

16α-(3-diethylamino-1-propynyl) - 3 - methoxy-estra-1,3,5(10)-triene-16,17β-diol, a compound of Formula I wherein W is a single bond, R is methyl, $R^1$ is hydrogen, $R^2$ is methyl, $R^3$ is hydrogen, X is hydroxy, and Y is $-C\equiv C-CH_2N(CH_2CH_3)_2$, especially in the form of a hydrochloric acid addition salt;

16α-(3-diethylaminopropyl) - 3 - methoxy-estra-1,3,5 (10)-triene-16,17β-diol, a compound of Formula I wherein W is a single bond, R is methyl, $R^1$ is hydrogen, $R^2$ is methyl, $R^3$ is hydrogen, X is hydroxy, and Y is $-CH_2CH_2CH_2N(CH_2CH_3)_2$, especially in the form of a hydrochloric acid addition salt;

16α-(3-diethylamino-1-propynyl) - 3 - ethoxyestra-1,3,5(10)-triene-16,17β-diol, a compound of Formula I wherein W is a single bond, R is methyl, $R^1$ is hydrogen, $R^2$ is ethyl, $R^3$ is hydrogen, X is hydroxy and Y is $-C\equiv C-CH_2N(C_2H_5)_2$, especially in the form of a hydrochloric acid addition salt;

16α-(3 - diethylaminopropyl) - 3 - estra - 1,3,5(10)-triene-16,17β-diol, a compound of Formula I wherein W is a single bond, R is methyl, $R^1$ is hydrogen, $R^2$ is ethyl, $R^3$ is hydrogen, X is hydroxy and Y is $$-CH_2CH_2CH_2N(C_2H_5)_2$$

especially in the form of a hydrochloric acid addition salt;

3-methoxy - 16α-(3 - pyrrolidino - 1 - propynyl)estra-1,3,5(10)-triene-16,17β-diol, a compound of Formula I wherein W is a single bond, R is methyl, R¹ is hydrogen, R² is methyl, R³ is hydrogen, X is hydroxy and Y is

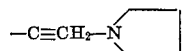

especially in the form of a hydrogen chloride addition salt;

3-methoxy-16α-(3-pyrrolidinopropyl) - estra-1,3,5(10)-triene-16,17β-diol, a compound of Formula I wherein W is a single bond, R is methyl, R¹ is hydrogen, R² is methyl, R³ is hydrogen, X is hydroxyl and Y is

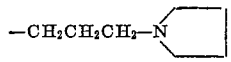

especially in the form of a hydrogen chloride addition salt;

3-methoxy - 16a - (3-piperidino - 1 - propynyl)estra-1,3,5(10)-16,17β-diol, a compound of Formula I wherein W is a single bond, R is a methyl, R¹ is hydrogen, R² is methyl, R³ is hydrogen, X is hydroxyl, and Y is

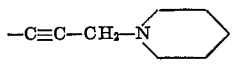

especially in the form of a hydrochloric acid addition salt;

3-methoxy - 16α - (3-morpholino - 1 - propynyl) estra-1,3,5(10)-triene-16,17β-diol, a compound of Formula I wherein W is a single bond, R is methyl, R¹ is hydrogen, R² is methyl, R³ is hydrogen, X is hydroxyl, and Y is

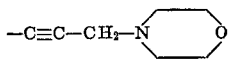

especially in the form of the hydrochloric acid addition salt;

16α-(3-dimethylamino - 1 - propynyl)-3-methoxyestra-1,3,5(10)-triene-16,17β-diol, a compound of Formula I wherein W is a single bond, R is methyl, R¹ is hydrogen, R² is methyl, R³ is hydrogen, X is hydroxyl and Y is —C≡C—CH$_2$N(CH$_3$)$_2$, especially in the form of the hydrochloric acid addition salt; and 3-methoxy - 16α - [3-(4-methyl - 1 - piperazinyl)-1-propynyl]-estra-1,3,5(10)-triene-16,17β-diol, a compound of Formula I wherein W is a single bond, R is methyl, R¹ is hydrogen, R² is methyl, R³ is hydrogen, X is hydroxyl and Y is

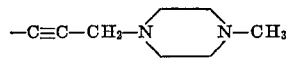

especially in the form of the dihydrochloric acid addition salt.

When used herein and in the appended claims, the term "alkyl of from about 1 to about 5 carbon atoms" contemplates lower hydrocarbon radicals, including, for example, methyl, ethyl, propyl, butyl and amyl radicals. The term "alkanoyl of from about 2 to about 5 carbon atoms" contemplates lower alkanoyl radicals such as acetyl, propionyl, butyroyl and pentanoyl. The term "alkoxy of from about 1 to about 5 carbon atoms" includes, for example, methoxy, ethoxy, propoxy, butoxy and pentoxy. The term "alkylene" used in association with the R⁶ group includes divalent hydrocarbon radicals of from about 2 to about 4 carbon atoms, illustrative members of which are ethylene, propylene, 2-methylpropylene, and the like. The term "alkanoyloxy of from about 2 to about 5 carbon atoms" contemplates and includes, for example, acetoxy, propionyloxy, butyroyloxy, pentanoyloxy, and the like. In all cases, the carbon chains of any of the above illustrative groups may be straight or branched. The term "non-toxic acid addition salts" contemplates pharmacologically-acceptable salts of the basic compounds of Formula I. Thus compounds of Formula I, excepting those amides wherein B is alkanoyl-substituted, will form salts with organic and inorganic acids. These salts can be used to isolate the compounds and, in addition, are just as useful in biocidally and pharmacologically as the free bases and, in many instances, because of improved solubility characteristics, they lend themselves advantageously to the formulation of a broader range of biocidal compositions and pharmacologically administrable forms. Illustrative of the salt-forming acids contemplated are inorganic acids such as hydrochloric, sulfuric, nitric, phosphoric, and the like, and organic acids such as acetic, malic, citric, aconitic, pamoic, and the like.

The 16α-aminoalkynyl (Ia) and the 16α-aminoalkyl (Ib) compounds of Formula I (excluding those wherein B is hydrogen) are prepared by treating an appropriately-substituted 16α-alkynyl steriod of Formula II with formaldehyde and an amine or amine salt, then hydrogenating the 16α-group, if required, according to the following sequence:

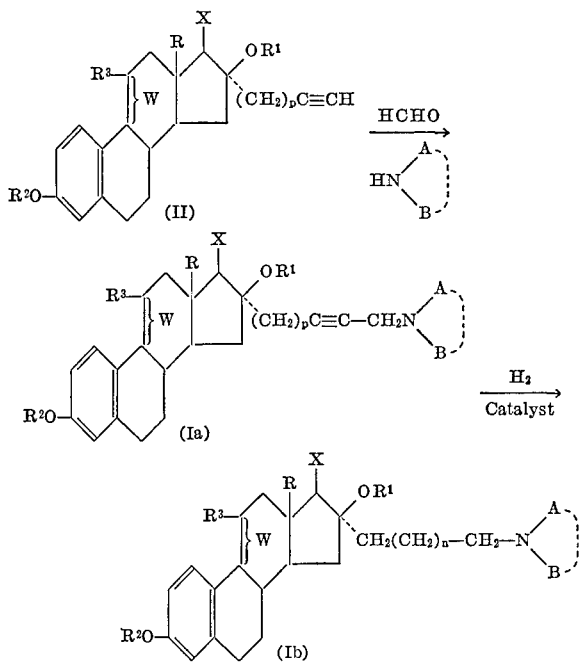

wherein W, R, R¹, R², R³, X, n, A and B (excluding hydrogen) are as above defined, p is 0 or 1, and "catalyst" is a hydrogenation catalyst, preferably a noble metal catalyst such as palladium supported on charcoal. The starting materials of Formula II wherein p is 0 are easily prepared following the procedures exemplified in detail in David A. Tyner, U.S. 3,002,008, or obvious chemical equivalents of such procedures. Starting materials of Formula II wherein p is 1 are prepared by treating the corresponding readily available 16-keto estradiols with propargyl bromide in the presence of magnesium and a catalyst such as mercuric chloride whereby the 16-keto group is selectively converted to a group of the formula

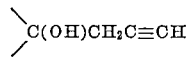

This procedure will be exemplified in detail hereinafter.

The first step in the sequence outlined above is, as will be recognized, a type of Mannich reaction. The conditions for this are not particularly critical and illustrative techniques will be exemplified in detail hereinafter. In general, the acetylenic steriod is suspended in an inert solvent, such as dioxane and is treated with a mixture of aqueous formaldehyde and the appropriate amine, preferably in the form of an addition salt with an organic, such as acetic, or an inorganic acid, such as hydrochloric. A very small amount of a metal salt catalyst, preferably cuprous chloride, can be added to improve the yield. The reaction is conducted at a temperature of from about 25° C. to about 100° C. and preferably at about 70° C. for a period of time long enough to effect the reaction; 24 hours at 68° C., for example, provides good yields in most cases. The product of Formula Ia is recovered by pouring the reaction mixture into a large excess of water, basifying with dilute sodium hydroxide, then extracting the organic material with ether. Treatment of the ether extract with an acid such as hydrochloric causes the product to precipitate in the form of an acid addition salt. It can be purified and used as such or can be liberated as the free base by treating the said salt with a strong alkali, such as sodium hydroxide.

A useful alternative in the case where it is desired to introduce groups such as the 4-methylpiperazinyl group, if X in compounds of Formula II is hydroxyl, is first to protect group X by a standard technique, such as by forming the 2-tetrahydropyranyl ether thereof, then to introduce the amine group by the Mannich technique shown above, then to remove the protective pyranyl ether group, regenerating the desired compound of Formula I$a$ wherein X is hydroxyl. An illustration of this technique will be exemplified in detail hereinafter.

The hydrogenation step is carried out by treating a compound of Formula I$a$ or an acid-addition salt thereof suspended in an inert solvent, such as ethanol, with hydrogen at low pressure, such as 10–50 p.s.i.g. at moderate temperature (about 20–50° C.) in the presence of a catalyst, preferably a noble metal catalyst such as palladium supported on charcoal until hydrogen uptake ceases. The product is recovered as a residue by filtering off the catalyst, evaporating the solvent. It may be purified by recrystallizations from an alcohol such as ethanol, if desired.

The 16α-monoalkylaminoalkynyl (I$c$) and the 16α-monoalkylaminoalkyl (I$d$) compounds of Formula I (B is hydrogen and $p$ is 0) are prepared by treating an appropriately substituted 16-keto estradiol (III) with an appropriately substituted N-monoalkyl propargylamine (generated in situ) in the presence of a strongly basic condensation agent, such as, for example sodium amide in liquid ammonia or an obvious chemical equivalent thereof, followed by hydrolysis, then selectively hydrogenating the 16α-group, if required, according to the following sequence:

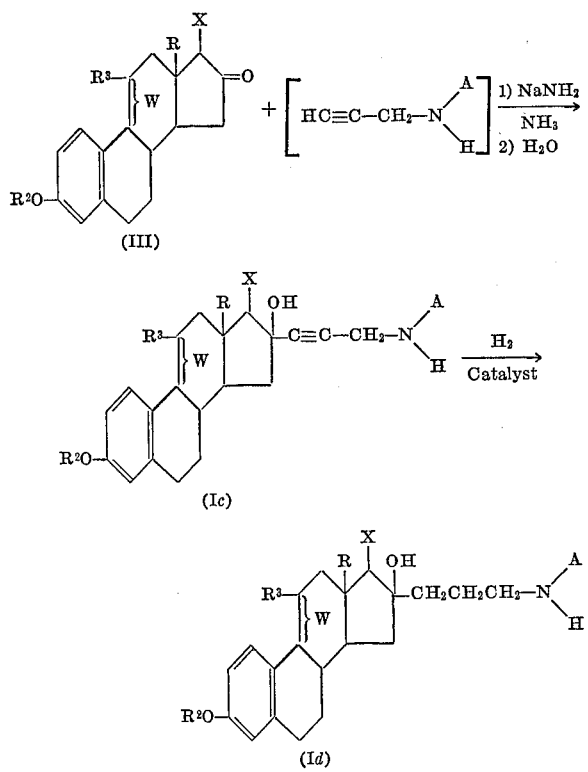

wherein W, R, R$^2$, R$^3$, X and A are as above defined. The amino-methyl-substituted sodium acetylide can be generated in situ from 2-chloro-3-alkylamino-1-propene with sodium amide in liquid ammonia. Reaction of this with the 16-keto steroid of Formula III is conveniently carried out at a temperature in the range of −35° to 100° C. with an excess of the sodium acetylide. After the reaction is completed, over a period of 1 to 24 hours, the reaction mixture is decomposed carefully with water which destroys the sodium salt and releases the compound of Formula I$c$. This can be removed from the mixture by extraction with an organic solvent such as ether and insolated from the extract by conventional procedures. Conversion of the 16α-alkynyl group in Formula I$c$ to the 16α-alkyl group in Formula I$d$ is done by hydrogenation in the presence of a catalyst entirely analogous to the procedure described above to convert Formula I$a$ to I$b$. Conversion of the 16β-hydroxyl group, any optional 17β-hydroxyl group and the mono-substituted amino group in either Formula I$c$ or I$d$ to an alkanoylated derivative is carried out, for example, by treatment with an alkanoyl halide in an inert solvent such as chloroform containing a small amount of pyridine or dimethylaniline. The alkanoylation is carried out under conventional conditions, usually at room temperature with an excess of the alkanoyl halide.

The compounds of Formula I of this invention have been found to possess biocidal properties, mainly in that they are inimical in very small amounts of the order of 15.6–1000 μg./ml. in aqueous media to the growth of amebae, protozao (trichomonads), fungae and the like. The instant compounds are thus useful in biocidal compositions in a variety of important fields of use. For example, they can be formulated and used in amebicidally-, trichomonacidally-, and fungicidally-active industrial cleaning compositions, and in soaps and detergents intended for veterinary use and in biocidally-active wash solutions to decontaminate premises, pastures, animal cages and the like, which have been infected with microorganisms, particularly of the type mentioned. They will be applied according to end use as powders, solutions, suspensions and the like, containing the active substance generally in concentrations of 0.1% to 0.7% by weight, or even as much as 1%, 1.5%, 1.8%, 2% and up to about 5%. In washing solutions for pastures and barns, the active compounds of this invention will be used generally in the range of from about 0.02% to .25% by weight.

Although, in common with most organic substances with relatively high molecular weights, compounds of Formula I have limited solubility in water, those skilled in the art will have no great difficulty in formulating them into a wide variety of biocidally-active compositions. In general, standard techniques can be employed and, where necessary, advantage is taken of the ability of compounds of Formula I to form salts, such as acid-addition salts, which have enhanced solubility in water. The active compounds per se can be made up in dilute aqueous solution. They can, in addition, where required be made up into more concentrated formulations with solvents such as N,N-dimethylacetamide or ethylene glycol dimethyl ether and the like. They can also be formulated as suspensions or solutions in an aqueous vehicle containing an organic co-solvent, such as for example, N,N-dimethylacetamide. Also, aqueous vehicles containing emulsifying agents, such as sodium lauryl sulfate, and relatively high concentrations, e.g., up to about 5% by weight, of the compounds of Formula I can be formulated by conventional techniques.

The compounds of Formula I of this invention also have demonstrated pharmacological activity. In particular they have been found to exert a depressant action on the central nervous system when tested under standard and accepted pharmacological procedures in animals, such as mice and rats. They are, therefore, deemed to possess utility in experimental and comparatively pharmacology and are of value to treat conditions in animals, such as valuable domestic animals, and in laboratory animals, such as mice, rats and the like, responsive to treatment with central nervous system depressant agents, such as the need to induce a calming effect. When used for such as mice and rats. They are, therefore, deemed to parenteral use with any of the usual inert carriers by the techniques well known to those skilled in the art.

Illustrative of the biocidal properties of the compounds of this invention are results of tests to determine anti-protozoal, especially trichomonicidal, activity.

A 12.5 mg. portion of test material (as based on active moiety) is added to 2.5 ml. of 1% phosphate buffer, pH 6. Further two-fold dilutions are made in the same buffer. A 1 ml. volume of each dilution is transferred to small sterile screw cap assay tubes containing 3.8 ml. of Diamond medium (formula furnished by American Type Culture Collection, Rockville, Md.) and 0.1 ml. of calf serum. Each assay tube is inoculated with 0.1 ml. of a 48–72 hour culture of Trichomonas vaginalis strain ATCC No. 13972. A control assay tube containing no test material is similarly inoculated. The assay tubes are gently shaken and then incubated for 48 hours at 30° C. Following incubation the tubes are gently shaken and with the aid of a Pasteur pipette a drop is deposited on a Spiers-Levy eosinophil counting chamber. The chamber is examined by phase contrast microscopy. The number of organisms present in 1 mm.$^2$ is multiplied by 5000 in order to express the count per ml. The difference in the number of organisms present in the control tube and in the tubes containing the test material represents the relatively potency of the test material and is expressed as the percentage kill at the specific dose level. Metronidazole may be used as a suitable positive control test material.

In these tests, Trichomonas vaginalis was completely killed (100% kill) by 16α-(3-diethylaminopropynyl)-3-methoxyestera-1,3,5(10)-triene-16β,17β - diol hydrochloride; d-3-methoxy-16α-(3-piperidino-1-propynyl)estra-1, 3,5(10)-triene-16,17β-diol, hydrochloride; and d-3-methoxy - 16α-[3-(4-methyl-1-piperazinyl) - 1 - propynyl] estra-1,3,5(10)-triene-16,17β-diol, dihydrochloride at 50 μg./ml.; by 16α-(3-diethylaminopropyl) - 3 - methoxyestra-1,3,5(10)-triene-16β,17β-diol hydrochloride and d-16α-(3-dimethylamino-1-propynyl) - 3 - methoxyestra-1, 3,5(10)-triene-16,17β-diol hydrochloride at 100 μg./ml.; by d-16α-(3-diethylaminopropyl) - 3 - ethoxyestra-1,3,5 (10)-triene-16,17β-diol hydrochloride at 25 μg./ml. d-3-methoxy - 16α - (3 - pyrrolidinopropyl)estra-1,3,5(10)-triene-16,17β-diol hydrochloride caused a 99% kill at 1000 μg./ml., and d-3-methoxy-16α-(3-morpholino-1-propynyl)estra - 1,3,5(10) - triene-16,17β-diol hydrochloride caused a 20% kill at 1000 μg./ml.

Also illustrative of the biocidal properties of the instant compounds are results of tests to determine antifungal activity, especially against pathogenic fungi, such as Histoplasma capsulatum.

A 50 mg. portion of test material is solubilized or suspended in 5 ml. of sterile distilled water. Further two-fold dilution are made in the same solvent. A 0.2 ml. volume of each dilution is transferred to a sterile stainless steel capped 13 x 100 mm. culture assay tube containing 1.8 ml. of Brain heart infusion fortified with 10% sheep blood; the agar infusion is in a molten stage at 47–48° C. The assay tube contents are well mixed and the agar is allowed to solidify as a slant. Each slant is inoculated with the yeast phase of Histoplasma capsulatum ATCC No. 11407 which has been grown for at least 96 hours in the same medium at 35° C.; the growth of the inoculum slant is suspended in 2 ml. sterile distilled water and a drop of the suspension delivered by a Pasteur pipette is used to inoculate each assay tube slant. The assay tubes are incubated for 6 days at 35° C. The assay tube containing the least amount of test material which completely inhibits growth is reported as the minimal inhibitory value and is reported in germs of μg./ml.

In this test, both 16α-(3-diethylaminopropynyl)-3-methoxyestra - 1,3,5(10)-triene-16β,17β-diol hydrochloride and 16α - (3 - diethylaminopropyl)-3-methoxyestra-1,3,5 (10)-triene-16β,17β-diol hydrochloride had a minimal inhibitory value (MIC) of 15.6 μg./ml.

An additional illustration of the biocidal activity of the instant compositions is demonstrated in the results of tests to determine anti-amebic activity, especially against Endameba histolytica.

The test substance is incorporated and diluted in the aqueous phase of Boeck-Drbohlav diphasic medium fortified with rice starch. The medium is inoculated with polybacteria and a known number of trophozoites of E. histolytica NIH 200. After 48 hours of incubation at 35° C., the trophozoites are counted. The procedure is derived from Thompson et al., Antibio. and Chemo., 6, 337–50 (1956).

In this test, 16α-(3-diethylaminopropynyl)3-methoxyestra-1,3,5(10)-triene-16,17β-diol hydrochloride caused a 77% kill at 500 μg./ml. and a 98% kill at 1000 μg./ml. and 16α-(3-diethylaminopropyl) - 3 - methoxyestra-1,3,5(10)-triene-16,17β-diol hydrochloride caused a 91% kill at 500 μg./ml. and a 99% kill at 100 μg./ml.

In the product of a total synthesis which has not included a suitable resolution stage the compounds prepared by the invention will be present as racemates. Using a convention approved by Fieser and Fieser, "Steroids," p. 336 (1959), the compounds designated as the d-forms are the enantiomers corresponding in configuration to that of the natural hormone estrone. The corresponding enantiomorphs are consequently designated the l-forms and the racemates the dl-forms.

Racemates will be depicted by structural formulas which show only the enantiomorphs of the d-configuration.

The following examples show the preparation of a number of compounds within the scope of this invention. They are merely illustrative and are not to be construed to limit the scope of the claims in any manner whatsoever.

Example 1.—16α-(3-diethylaminopropynyl)3-methoxyestra-1,3,5(10)-triene-16,17α-diol and hydrochloride A suspension of 3.7 g. of 16α-ethynyl-3-methoxyestra-1,3,5(10)-triene-16,17β-diol (Example 1, U.S. 3,002,008), 33 ml. of dioxane, 2.2 ml. of water, 1.1 ml. of 40% aqueous formaldehyde, 2.5 ml. of acetic acid, 1.1 ml. of diethylamine and 89 mg. of cuprous chloride is stirred for 24 hours at 68° C. The reaction mixture is poured into ice-water and after adjustment to pH 12 with 2 N sodium hydroxide solution, the liberated product in the form of the free base is extracted into ether. The ether solution is treated with an excess of 5.7 N hydrochloric acid in isopropanol and the precipitated product in the form of an acid addition salt with hydrogen chloride is recovered. Reprecipitation from methanol with ether yields 2.4 g. of product, M.P. 214–215° C.

Analysis.—Calc'd. for $C_{26}H_{37}NO_3 \cdot HCl \cdot H_2O$: C, 67.00; H, 8.65; N, 3.01; Cl, 7.61. Found: C, 66.85; H, 8.45; N, 3.30; Cl, 7.6.

This compound inhibits the growth of the pathogenic fungus Histoplasma capsulatum in concentrations as low as 15.6 micrograms per milliliter.

Example 2.—16α-(3-diethylaminopropyl)-3-methoxyestra-1,3,5(10)-triene-16,17β-diol and hydrochloride A suspension of 10 g. of 16α-(3-diethylaminopropynyl)-3-methoxyestra-1,3,5(10)-triene-16,17β - diol hydrochloride in 300 ml. of ethanol and 3.0 g. of 5% palladium on charcoal catalyst is hydrogenated at 1 atmosphere pressure until hydrogen uptake ceases. The catalyst is filtered off and the solvent is evaporated. The residue is dissolved in methanol and precipitated with ether to obtain 4.0 g. of product, M.P. 240–250° C.

*Analysis.*—Calcd. for $C_{26}H_{41}NO_3 \cdot HCl \cdot H_2O$: C, 65.98; H, 9.28; N, 2.88; $H_2O$, 3.8. Found: C, 66.43; H, 9.43; N, 2.98; $H_2O$, 3.82.

The free base is obtained by dissolving the hydrochloric acid salt in water, adding sodium hydroxide solution to pH 12, extracting the liberated free base with ether and evaporating the ether. The product inhibits the growth of the pathogenic fungus *Histoplasma capsulatum* in concentrations as low as 15.6 micrograms per milliliter.

Example 3.—16α-(4-diethylamino-2-butynyl)-3-methoxyestra-1,3,5(10)-trien-16-ol and hydrochloride (a) 3-methoxy-16α-(2-propynyl)-estra-1,3,5(10)-trien-16-ol.—To a mixture of 500 mg. of magnesium foil and 30 mg. of mercuric chloride in 10 ml. of absolute ether is gradually added, in a nitrogen atmosphere, a solution of 1.3 g. of propargyl bromide and 2.8 g. of 3-methoxyestra-1,3,5(10)-trien-16-one in 200 ml. of ether and 100 ml. of benzene. The resulting mixture is kept boiling continually under reflux while being stirred. When the reaction subsides, heat is applied and refluxing and stirring are continued for one hour. The reaction mixture is cooled and poured into an excess of ice cold 2 N sulfuric acid. The phases are separated and the aqueous phase extracted with ether. The combined organic phases are washed with sodium bicarbonate solution, dried over magnesium sulfate and the organic solvents removed in vacuo to give 3-methoxy-16α-(2-propynyl)-estra-1,3,5(10)-trien-16-ol.

(b) 16α - (4-diethylamino-2-butynyl)-3-methoxyestra-1,3,5(10)-trien-16-ol.—A suspension of 3.0 g. of 3-methoxy-16α-(2-propynyl)estra-1,3,5(10)-trien-16β - ol, 27.0 ml. of dioxane, 1.8 ml. of water, 0.9 ml. of formaldehyde (40% aqueous solution), 2.0 ml. of acetic acid, 0.9 ml. of diethylamine, and 72 mg. of cuprous chloride is stirred for 24 hours at 68° C. The reaction mixture is poured into ice-water and after adjustment to pH 12 with 2 N sodium hydroxide solution, the material is extracted with ether. The ether solution is treated with an excess of 5.7 N hydrochloric acid in isopropanol. The resulting precipitate is filtered to give 16α-(4-diethylamino-2-butynyl)-3-methoxyestra-1,3,5(10)-trien-16-ol hydrochloride.

Example 4.—16α-(4-diethylaminobutyl)-3-methoxyestra-1,3,5(10)-trien-16 -ol hydrochloride A suspension of 2.0 g. of 16α-(4-diethylamino-2-butynyl)-3-methoxyestra-1,3,5(10)-trien-16-ol hydrochloride in 60 ml. of ethanol and 600 mg. of 5% palladium on charcoal catalyst is hydrogenated at 1 atmosphere pressure until hydrogen uptake ceases. The catalyst is filtered off and the solvent is evaporated. The residue is dissolved in methanol and precipitated with ether to yield the product. The free base is obtained by treatment of the hydrochloride with sodium hydroxide according to the procedure of Example 2.

Example 5.—16α-(3-methylaminopropynyl)-3-methoxyestra-1,3,5(10)-trien-16 -ol and hydrochloride 2-chloro-3-methylamino-1-propene (11.6 g.) is added to sodium amide (0.2 mole) in 450 ml. of liquid ammonia, the mixture is stirred for 4 hours and then 9.4 g. of 3-methoxyestra-1,3,5(10)-trien-16-one in 300 ml. of benzene is added. After stirring for 4 hours, the condenser is removed and the ammonia is evaporated. Ether (200 ml.) and 100 g. of ice are added and the mixture is stirred for 30 minutes. The organic layer is separated, dried and the solvents are evaporated in vacuum. The residue is dissolved in ether and the ether solution is treated with an excess of 5.7 N hydrochloric acid in isopropanol and the precipitated product in the form of an acid addition salt with hydrogen chloride is recovered.

Example 6.—16-(3-methylaminopropyl)-3-methoxyestra-1,3,5(10)-trien-16 -ol and hydrochloride A suspension of 10 g. of 16-(3-methylaminopropynyl)-3-methoxyestra-1,3,5(10)-trien-16-ol hydrochloride in 300 ml. of ethanol and 3 g. of 5% palladium on charcoal catalyst is hydrogenated at atmospheric pressure until hydrogen uptake ceases. The catalyst is filtered off and the solvent is evaporated. The residue is dissolved in methanol and precipitated with ether to afford the hydrochloride of the title compound. The free base is obtained by treatment of the hydrochloride with sodium hydroxide according to the procedure of Example 2.

Example 7.—16α-(3-diethylamino-1-propynyl)-3-ethoxyestra-1,3,5(10)-triene-16,17β-diol and hydrochloride To a solution of 1.7 g. of 3-ethoxy-16α-ethynylestra-1,3,5(10)-triene-16,17β-diol in 12.6 ml. of dioxane is added 1.0 ml. of water, 1.0 ml. of a 40% Formalin solution, 0.9 ml. of diethylamine, 0.41 ml. of acetic acid and 35 mg. of cuprous chloride. The mixture is stirred under nitrogen for 22 hours at 60° C. The reaction mixture is then poured into ice cold water and made alkaline with 10% sodium hydroxide solution and extracted with ether. The combined ether extracts are washed with brine and dried ($MgSO_4$). Acidification of the organic layer with isopropanolic HCl solution affords 1.2 g. of a white precipitate identified to be the title compound, M.P. 235° C., $$\lambda_{max.}^{KBr}\ 3.02,\ 3.47,\ 3.82,\ 6.22,\ 6.66.$$

*Analysis.*—$C_{27}H_{39}O_3N \cdot HCl$ requires: C, 70.19; H, 8.73; N, 3.03; Cl, 7.68. Found: C, 70.20; H, 8.39; N, 3.17; Cl, 7.60.

Example 8.—16α-(3-diethylaminopropyl)-3-ethoxyestra-1,3,5(10)-triene-16,17β-diol and hydrochloride To a solution of 0.94 g. of 16α-(3-diethylamino-1-propynyl) - 3 - methoxyestra - 1,3,5(10) - triene - 16,17β diol, hydrochloride in 50 ml. 95% ethanol is added 0.3 g. of 5% Pd/C under nitrogen. The suspension is hydrogenated at 1 atmosphere until the uptake of 2 moles of hydrogen is complete (15 minutes in this instance). The Pd/C is removed by filtration through filter aid, and the solvent is removed under reduced pressure. The residual material is dissolved in a small amount of ethanol and precipitated with ether. The white product is filtered to obtain 0.83 g. of the title compound, M.P. 143–148° C., $$\lambda_{max.}^{KBr}\ 3.05,\ 3.48,\ 6.22,\ 6.42\mu.$$

*Analysis.*—$C_{27}H_{43}O_3N \cdot HCl \cdot \frac{1}{2}H_2O$ requires: C, 68.25; H, 9.97; N, 2.94; Cl, 7.46. Found: C, 67.78; H, 9.41; N, 2.94; Cl, 7.93.

Example 9.—3-methoxy-16α-(3-pyrrolidino-1-propynyl) estra-1,3,5(10-triene-16,17β-diol and hydrochloride To a solution of 2.0 g. of 16α-ethynyl-3-methoxyestra-1,3,5(10)triene-16,17β-diol in 17.8 ml. of dioxane is added 1.1 ml. of water, 0.6 ml. of a 40% Formalin solution, 1.36 ml. of glacial acetic acid, 0.53 g. of freshly distilled pyrrolidine and 50 mg. of cuprous chloride. The mixture is stirred under nitrogen for 20 hours at 60° C. The reaction is then poured into ice water, made slightly basic with 10% sodium hydroxide solution, and extracted with ether. The combined ether extracts are washed with brine solution and dried ($MgSO_4$). The ether layer is filtered and the clear solution is acidified with isopropanolic·HCl solution to give 1.24 g. of an unstable salt, gradually turning from white to brown in air, identified to be the title compound $$\lambda_{max.}^{KBr}\ 3.05,\ 3.48,\ 3.75,\ 6.22,\ 6.68\mu.$$

Example 10.—3-methoxy-16α-(3 - pyrrolidinopropyl)-estra-1,3,5(10)-triene-16,17β-diol and hydrochloride To a solution of 1.24 g. of 16α-(3-pyrrolidino-1-propynyl)-3-methoxyestra-1,3,5(10) - triene-16,17β-diol, hydrochloride in 50 ml. of 95% ethanol is added 0.4 g. of Pd/C with a few drops of concentrated hydrochloric acid under nitrogen. The mixture is hydrogenated at 1 atmosphere until the uptake of 2 moles of hydrogen is completed (45 minutes in this instance). The Pd/C is removed by filtration through filter aid, and the solvent is removed in vacuo. The residue is dissolved in chloroform and washed with 10% NaOH solution to obtain the free base. The organic layer is washed with brine solution, dried ($MgSO_4$), and reduced to a small volume in vacuo. The chloroform solution is then saturated with hydrogen chloride and treated with ether. The resulting precipitate is recrystallized from acetone-ether to yield 0.4 g. light brown crystals identified to be the title compound, M.P. 204–209° C., softens at 95–100° C.;

$\lambda_{max.}^{KBr}$ 3.05, 3.48, 3.75, 6.21, 6.37, 6.68$\mu$.

Analysis.—$C_{26}H_{38}O_2N \cdot HCl \cdot H_2O$ requires: C, 66.71; H, 9.26; N, 2.99; Cl, 7.58; $H_2O$, 3.84. Found: C, 67.08; H, 8.55; N, 3.03; Cl, 7.86; $H_2O$, 3.86.

Example 11.—3-methoxy-16α-(3-piperidino-1-propynyl-estra-1,3,5(10)-triene-16,17β-diol and hydrochloride To a solution of 2.0 g. of 16α-ethynyl-3-methoxyestra-1,3,5(10)-triene-16,17β-diol in 18 ml. of dioxane is added 1.1 ml. of water, 0.6 ml. of 40% formaldehyde solution, 1.36 ml. of glacial acetic acid, 0.61 ml. of piperidine, and 50 mg. of cuprous chloride. The mixture is stirred at 60° C. under nitrogen for 24 hours. The reaction mixture is then poured into ice-water, basified with 10% potassium hydroxide solution and the resulting precipitate is extracted with ether. The ether extracts are washed with saturated brine solution and dried ($Na_2SO_4$). The clear ether solution is acidified with isopropanolic·HCl. The resulting precipitate is recrystallized twice from methanol-ether to obtain 0.8 g. of a light brown product identified to be the title compound, M.P. 258–261° C., $\lambda_{max.}^{KBr}$ 3.05, 3.50, 3.85, 4.00, 6.25, 6.70$\mu$.

Analysis.—$C_{27}H_{37}NO_3 \cdot HCl \cdot \frac{1}{2}H_2O$: requires C, 69.13; H, 8.38; N, 2.99; Cl, 7.56; $H_2O$, 1.92. Found: C, 68.89; H, 8.23; N, 3.27; Cl, 7.92; $H_2O$, 2.91.

Example 12.—3-methoxy-16α(3-morpholino-1-propynyl) estra-1,3,5(10)-triene-16,17β-diol and hydrochloride To a solution of 2.0 g. of 16α-ethynyl-3-methoxy-1,3,5(10)-triene-16,17β-diol in 18 ml. of dioxane is added 1.1 ml. of water, 0.6 ml. of 40% formaldehyde solution, 1.36 ml. of acetic acid, 0.55 ml. of morpholine, and 50 mg. of cuprous chloride. The mixture is stirred at 60° C. for 24 hours under nitrogen. The reaction mixture is then poured into ice water, basified with 10% potassium hydroxide solution, and the resulting precipitate was extracted with ether. The combined ether extracts are washed with saturated brine solution and dried ($MgSO_4$). The clear ether solution is acidified with isopropanolic·HCl. The resulting precipitate is collected and recrystallized from methanol-ether, 1:1, to obtain 0.8 g. of off-white needles identified to be the title compound, M.P. 244–248° C., dec.

$\lambda_{max.}^{KBr}$ 3.23, 3.50, 6.21, 6.68$\mu$.

Analysis.—$C_{26}H_{35}NO_4 \cdot HCl \cdot \frac{1}{2}H_2O$ requires: C, 66.29; H, 7.92; N, 2.97; Cl, 7.53; $H_2O$, 1.91. Found: C, 66.40; H, 7.96; N, 3.18; Cl, 7.25; $H_2O$, 1.12.

Example 13.—16α-3-dimethylamino-1-propynyl)-3-methoxyestra-1,3,5(10)-triene-16,17β-diol and hydrochloride To a solution of 2.0 g. of 16α-ethynyl-3-methoxyestra-1,3,5(10)-triene-16,17β-diol in 18 ml. of dioxane is added 1.1 ml. of water, 0.6 ml. of 40% Formalin solution, 1.36 ml. of glacial acetic acid, 1.6 ml. of a 25% aqueous solution of dimethylamine, and 50 mg. of cuprous chloride. The mixture is stirred at 60° C. under nitrogen for 24 hours. The reaction is then poured into ice water and basified with 10% KOH solution. The resulting precipitate is extracted with ether. The combined ether extracts are washed with water and saturated brine solution and then dried ($MgSO_4$). The clear ether filtrate is acidified with isopropanolic·HCl. The precipitate is collected and recrystallized from methanol-ether to obtain 0.43 g. of needles identified to be the title compound, M.P. 250–252° C., $\lambda_{max.}^{KBr}$ 3.05, 3.47, 3.80, 6.20, 6.32, 6.65$\mu$.

Analysis.—$C_{24}H_{33}NO_3 \cdot HCl \cdot \frac{1}{2}H_2O$ requires: C, 67.19; H, 8.22; N, 3.27; Cl, 8.27; $H_2O$, 2.10. Found: C, 66.97; H, 8.35; N, 3.66; Cl, 8.53; $H_2O$, 3.61.

Example 14.—3-methoxy-16α-[3-(4-methyl-1-piperazinyyl)-1-propynyl]estra-1,3,5(10)-triene-16,17β-diol and dihydrochloride To a solution of 2.0 g. of 16α-ethynyl-3-methoxyestra-1,3,5(10)-triene-16,17β-diol in 90 ml. of dry benzene is added 4 ml. of dry dihydropyran and 105 mg. of p-toluene sulfonic acid monohydrate. The solution is allowed to stand at 22° C. for 48 hours. Pyridine, 2.0 ml., is then added before washing the organic solution with saturated sodium bicarbonate solution, saturated brine solution and drying ($MgSO_4$). Removal of the solvent in vacuo affords a dark colored oil identified by TLC and IR to be the 17-pyranyl ether. The oil is dissolved in 100 ml. of dioxane to which is added 10 ml. of a 30% aqueous solution of N-methylpiperazine, 2.0 g. of paraformaldehyde, and 50 mg. of cuprous chloride. The reaction mixture is maintained at 90° C. with stirring in a nitrogen atmosphere for 5 days with periodic additions of a total of 1.2 g. of p-formaldehyde. The dioxane is then removed in vacuo and the residue is diluted with ether. The ethereal layer is extracted with a 10% hydrochloric acid solution. The acid extract is allowed to stand at room temperature for two hours before basifying with 10% sodium hydroxide solution. The resulting precipitated is extracted with chloroform and the organic layer is washed with brine and dried ($MgSO_4$). The chloroform is removed in vacuo and the residue treated with ether and isopropanolic·HCl. The resulting precipitate is collected, dissolved in a little methanol and reprecipitated by adding ether. This treatment is repeated several times until most of the dark color is gone. The product is finally recrystallized twice from methanol to obtain 0.4 g. of material identified to be the title compound, M.P. 215–220° C., $\lambda_{max.}^{KBr}$ 3.05, 3.49, 4.00, 6.22, 6.69$\mu$.

Analysis.—$C_{27}H_{38}O_2N_2 \cdot 2HCl \cdot 1\frac{1}{2}H_2O$ requires: C, 62.06; H, 8.30; N, 5.36; Cl, 13.57; $H_2O$, 5.17. Found: C, 62.38; H, 8.42; N, 5.24; Cl, 14.43; $H_2O$, 4.78.

A suspension of 10 g. of 16-(3-methylaminopropynyl)-3-methoxyestra-1,3,5(10-trien-16-ol hydrochloride in 300 ml. of ethanol and 3 g. of 5% palladium on charcoal catalyst is hydrogenated at atmospheric pressure until hydrogen up-take ceases. The catalyst is filtered off and the solvent is evaporated. The residue is dissolved in methanol and precipitated with ether to afford the hydrochloride of the title compound. The free base is obtained by treatment of the hydrochloride with sodium hydroxide according to the procedure of Example 2.

Example 15

The procedures of Examples 1 to 4 are repeated substituting stoichiometrically equivalent amounts of appropriately substituted 16α-ethynyl and 16α-(2-propynyl)-3-methoxyestra-1,3,5(10)-triene-16-ols and secondary amines and hydrogenating the Mannich bases and the following compounds within the scope of this invention are obtained:

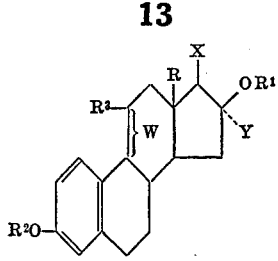

| W | R | R₁ | R₂ | R₃ | X | Y |
|---|---|---|---|---|---|---|
| Unsat | $C_2H_5$ | H | H | OH | H | $-CH_2C\equiv CCH_2N(CH_3)_2$ |
| Sat | $C_2H_5$ | H | H | OH | H | $-CH_2(CH_2)_2CH_2N(CH_3)_2$ |
| Sat | $CH_3$ | H | $CH_2CH_3$ | H | OH | $-C\equiv C-CH_2N\begin{smallmatrix}CH_3\\(CH_2)_2N(C_2H_5)_2\end{smallmatrix}$ |
| Sat | $CH_3$ | H | $(CH_2)_3CH_3$ | H | H | $-C\equiv C\equiv CH_2-N\square$ |
| Sat | $CH_3$ | H | $(CH_2)_2N(C_2H_5)_2$ | H | H | $-C\equiv C-CH_2-N\square O$ |
| Sat | $CH_3$ | H | $CH_3$ | H | H | $-C\equiv C-CH_2-N\square N-CH_3$ |
| Sat | $CH_3$ | H | $(CH_2)_3CH_3$ | H | H | $-CH_2CH_2CH_2-N\square$ |
| Sat | $CH_3$ | $COCH_3$ | $CH_3$ | $OCOCH_3$ | H | $-C\equiv C-CH_2N(C_2H_5)_2$ |
| Sat | $CH_3$ | $COCH_3$ | $CH_3$ | H | $OCOCH_3$ | $-C\equiv C-CH_2N(C_2H_5)_2$ |
| Sat | $CH_3$ | $COCH_3$ | $CH_3$ | H | $OCOCH_3$ | $-CH_2CH_2CH_2N(C_2H_5)_2$ |
| Sat | $CH_3$ | Adamantoyl | $CH_3$ | H | Adamantoyloxy | $-C\equiv C-CH_2N(C_2H_5)_2$ |
| Sat | $CH_3$ |  | $CH_3$ | H | $-O-C(CH_3)_2-$ | $-C\equiv C-CH_2N(C_2H_5)_2$ |
| Sat | $CH_3$ |  | $CH_3$ | H | $-O-C(CH_3)_2-$ | $-CH_2CH_2CH_2N(C_2H_5)_2$ |

Example 16

The procedures of Examples 5 and 6 are repeated substituting stoichiometrically equivalent amounts of appropriately substituted 2-chloro-3-monoalkylamino-1-propenes and 16-keto-esterones, and hydrogenating the product to obtain the following compounds within the scope of this invention:

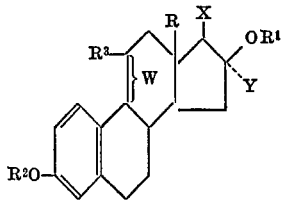

| W | R | R₁ | R₂ | R₃ | X | Y |
|---|---|---|---|---|---|---|
| Unsat | $CH_3$ | H | $CH_3$ | H | OH | $-C=CCH_2NHCH_3$ |
| Sat | $CH_3$ | H | $(CH_2)_2N(CH_3)_2$ | H | H | $-C=CCH_2NH(C_5H_{11}\text{-}n)$ |
| Sat | $CH_3$ | H | $CH_2CH_3$ | H | OH | $-C=CCH_2NH[(CH_2)_2N(C_2H_5)_2]$ |
| Sat | $CH_3$ |  | $CH_3$ | H | $-O-C(CH_3)_2-$ | $-C=CCH_2NHCH_3$ |
| Sat | $CH_3$ |  | $CH_3$ | H | $-O-C(CH_3)_2-$ | $-CH_2CH_2CH_2NHCH_3$ |

Example 17

The hydrochloric, sulfuric, nitric, phosphoric, acetic, malic, citric, aconitic and pamoic acid addition salts of 16α-(3-diethylamino-1-propynyl)-3-methoxyestra-1,3,5(10)triene-16,17β-diol (Example 1) and 16α-(3-diethylaminopropyl)-2-methoxyestra-1,3,5(10)-triene-16,17β-diol (Example 2) are prepared by treating in ether solution of the respective free bases with stoichiometrically equivalent amounts of the respective acids in isopropanol, then evaporating the solvents, leaving the addition salt as a residue.

Example 18

The free bases of Examples 5 and 6 respectively are reacted with acetyl chloride in chloroform containing a small amount of pyridine. There are obtained 16α-(3-acetyl-3-methylaminopropynyl) - 3 - methoxyestra - 1,3,5(10)-trien-16-ol, 16-acetate and 16α-(3-acetyl-3-methylaminopropyl) - 3 - methoxy - 1,3,5(10) - trien-16-ol, 16-acetate.

We claim:
1. A compound selected from those of the formula

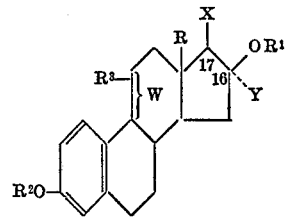

wherein:

W is a single or a double bond;
R is alkyl of from 1 to 5 carbon atoms;
R¹ is hydrogen or alkanoyl of from 1 to 5 carbon atoms;
R² is hydrogen, alkyl of from 1 to 5 carbon atoms or

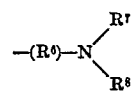

wherein:
R⁷ and R⁸ are alkyl of from 1 to 5 carbon atoms and R₆ is a divalent alkylene group containing from 2 to 4 carbon atoms;

R³ is hydrogen, hydroxy or alkanoyloxy of from 2 to 5 carbon atoms;

X is hydrogen, hydroxy, alkanoyloxy of from 2 to 5 carbon atoms, adamantoyloxy, or, when taken together with OR¹, forms a ketal ring of the partial formula

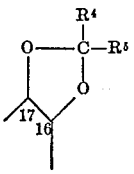

wherein R⁴ and R⁵ are alkyl of from 1 to 5 carbon atoms; and Y is

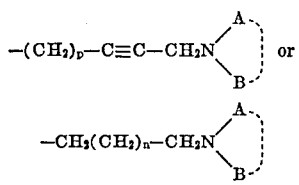

$p$ being 0 or 1, $n$ being 1 or 2, and wherein A and B independently are alkyl of from 1 to 5 carbon atoms or

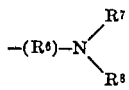

wherein R⁶, R⁷ and R⁸ are as defined hereinabove, or when $p$ is 0 and $n$ is 1, B is hydrogen or alkanoyl of from 2 to 5 carbon atoms, or when taken together, A and B form a divalent radical selected from —(CH₂)—, $m$ being a whole number of from 2 to 8;

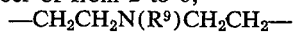

R⁹ being hydrogen or alkyl of from 1 to 5 carbon atoms; or —CH₂CH₂OCH₂CH₂—; and non-toxic acid-addition salts thereof.

2. A compound as defined in claim 1, which is 16α-(3-diethylamino - 1 - propynyl)-3-methoxyestra-1,3,5(10)triene-16,17β-diol.

3. A compound as defined in claim 1, which is 16α-(3 - diethylaminopropyl) - 3 - methoxyestra - 1,3,5(10) triene-16,17β-diol.

4. A compound as defined in claim 1, which is 16α-(3-diethylamino-1-propynyl) - 3 - ethoxyestra-1,3,5(10)triene-16,17β-diol.

5. A compound as defined in claim 1, which is 16α-(3 - diethylaminopropyl) - 3 - ethoxyestra - 1,3,5(10) triene-16,17β-diol.

6. A compound as defined in claim 1, which is 3-methoxy-16α - (3 - pyrrolidino-1-propynyl)estra-1,3,5(10) triene-16,17β-diol.

7. A compound as defined in claim 1, which is 3-methoxy - 16α - (3 - pyrrolidinopropyl)-estra-1,3,5(10) triene-16,17β-diol.

8. A compound as defined in claim 1, which is 3-methoxy - 16α - (3 - piperidino - 1 - propynyl)estra-1,3,5(10)triene-16,17β-diol.

9. A compound as defined in claim 1, which is 3-methoxy-16α-(3-morpholino-1-propynyl)estra - 1,3,5(10) triene-16,17β-diol.

10. A compound as defined in claim 1, which is 16α-(3-dimethylamino-1-propynyl)-3-methoxyestra - 1,3,5(10) triene-16,17β-diol.

11. A compound as defined in claim 1, which is 3-methoxy - 16α-[3 - (4-methyl-1-piperazinyl)-1-propynyl] estra-1,3,5(10)triene-16,17β-diol.

References Cited

UNITED STATES PATENTS 3,103,524   9/1963   Bowers et al. _____ 260—397.5

ELBERT L. ROBERTS, Primary Examiner

U.S. Cl. X.R.

260—239.55, 397.5; 424—241